United States Patent
Delvaux

(10) Patent No.: US 6,608,571 B1
(45) Date of Patent: Aug. 19, 2003

(54) SYSTEM AND METHOD FOR COMMUNICATING OVER A ONE-WIRE BUS

(75) Inventor: Marc Delvaux, Metuchen, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 10/140,624

(22) Filed: May 7, 2002

Related U.S. Application Data
(60) Provisional application No. 60/291,272, filed on May 16, 2001.

(51) Int. Cl.$^7$ ............................ G06F 13/00; H03M 5/08
(52) U.S. Cl. ........................... 341/53; 707/100; 707/106
(58) Field of Search ..................... 341/50, 53; 710/100, 710/106, 124, 305

(56) References Cited

U.S. PATENT DOCUMENTS

| | | | | |
|---|---|---|---|---|
| 3,932,841 A | * | 1/1976 | Deerfield et al. | 710/107 |
| 5,850,154 A | * | 12/1998 | Higuchi | 326/86 |
| 6,112,275 A | * | 8/2000 | Curry et al. | 711/100 |
| 6,466,572 B1 | * | 10/2002 | Ethridge et al. | 370/352 |
| 6,493,351 B1 | * | 12/2002 | Shideler | 370/438 |

OTHER PUBLICATIONS

Transmitting Data and Power Over a One–Wire Bus Dan Awtrey, Feb. 1997.
The I2C Bus Protocol The I2C Faq (http://www.ping.be/~ping0751/i2cfaq/i2cfaq.htm); Printed Apr. 25, 2002.

* cited by examiner

Primary Examiner—Peguy JeanPierre
(74) Attorney, Agent, or Firm—Thomas, Kayden, Horstemeyer & Risley

(57) ABSTRACT

A one-wire protocol is described, wherein a one-wire bus has either a wired-AND configuration or a wired-OR configuration. In this protocol, data is encoded using time modulation. In one embodiment, two devices communicate with each other through the one-wire bus. One device is configured to transmit data by driving the one-wire bus high, while the other device is configured to transmit data by driving the one-wire bus low. In a preferred embodiment, transmission of data by each of the two devices is interleaved in such a fashion so that there is a bit-for-bit exchange between one device and the other device. In another embodiment, more than two devices may communicate through the one-wire bus.

30 Claims, 10 Drawing Sheets

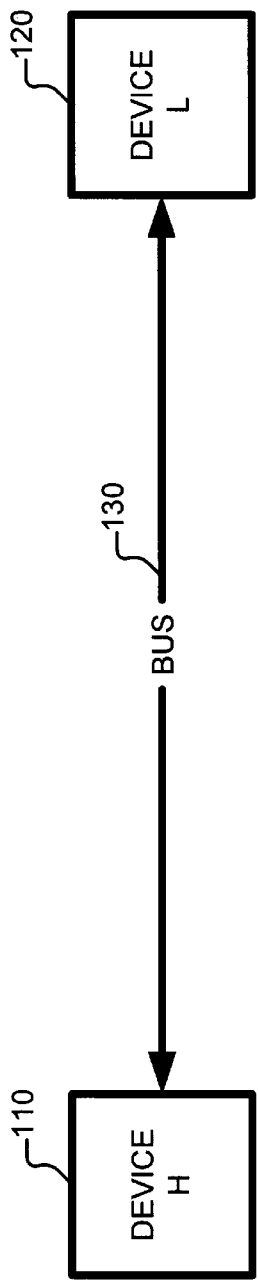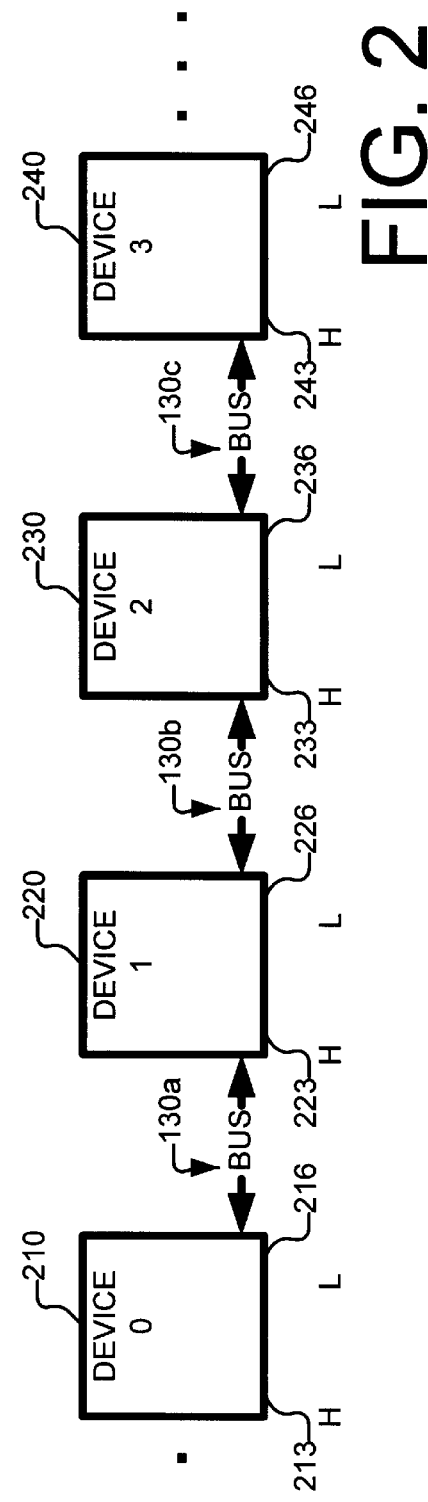

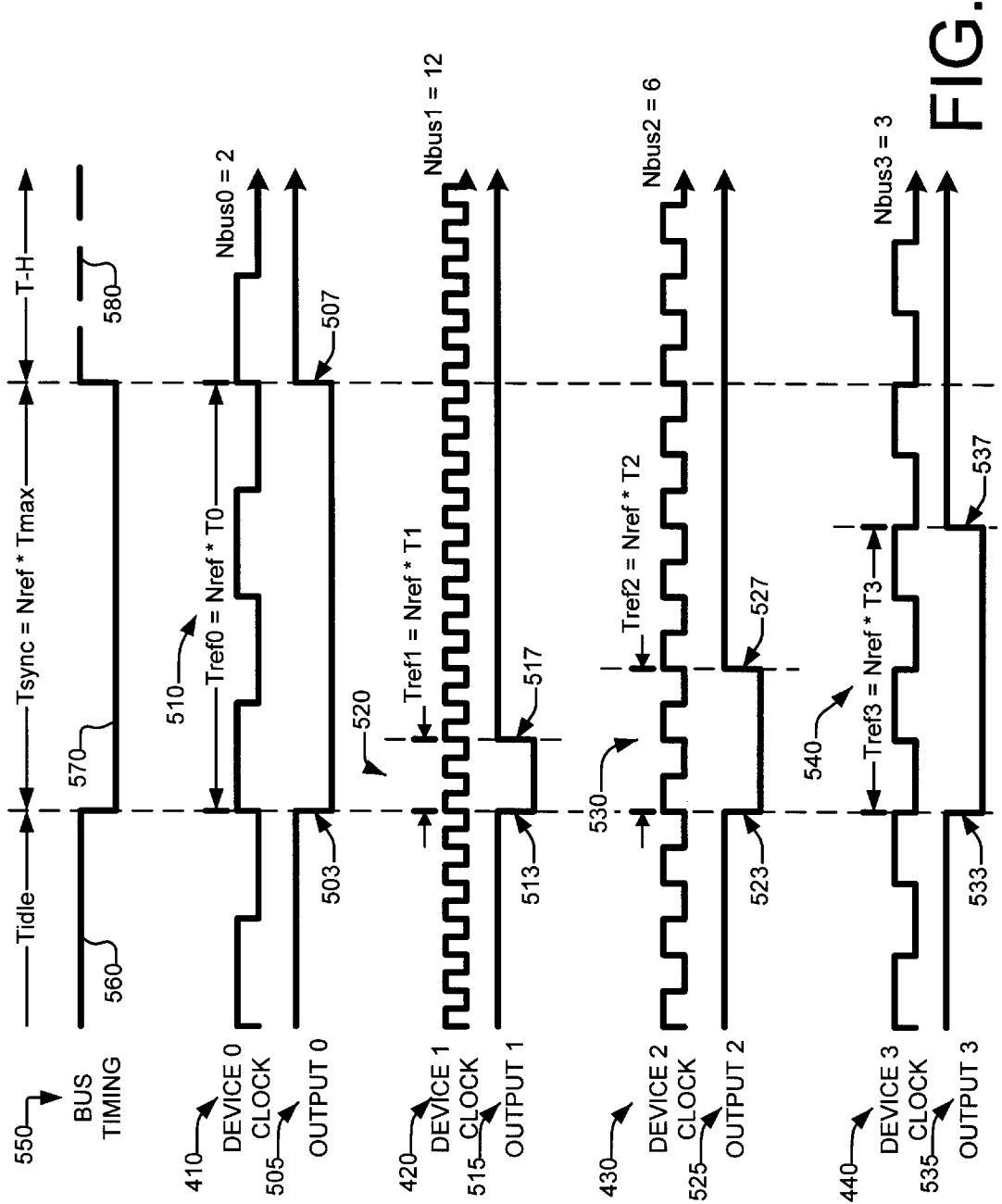

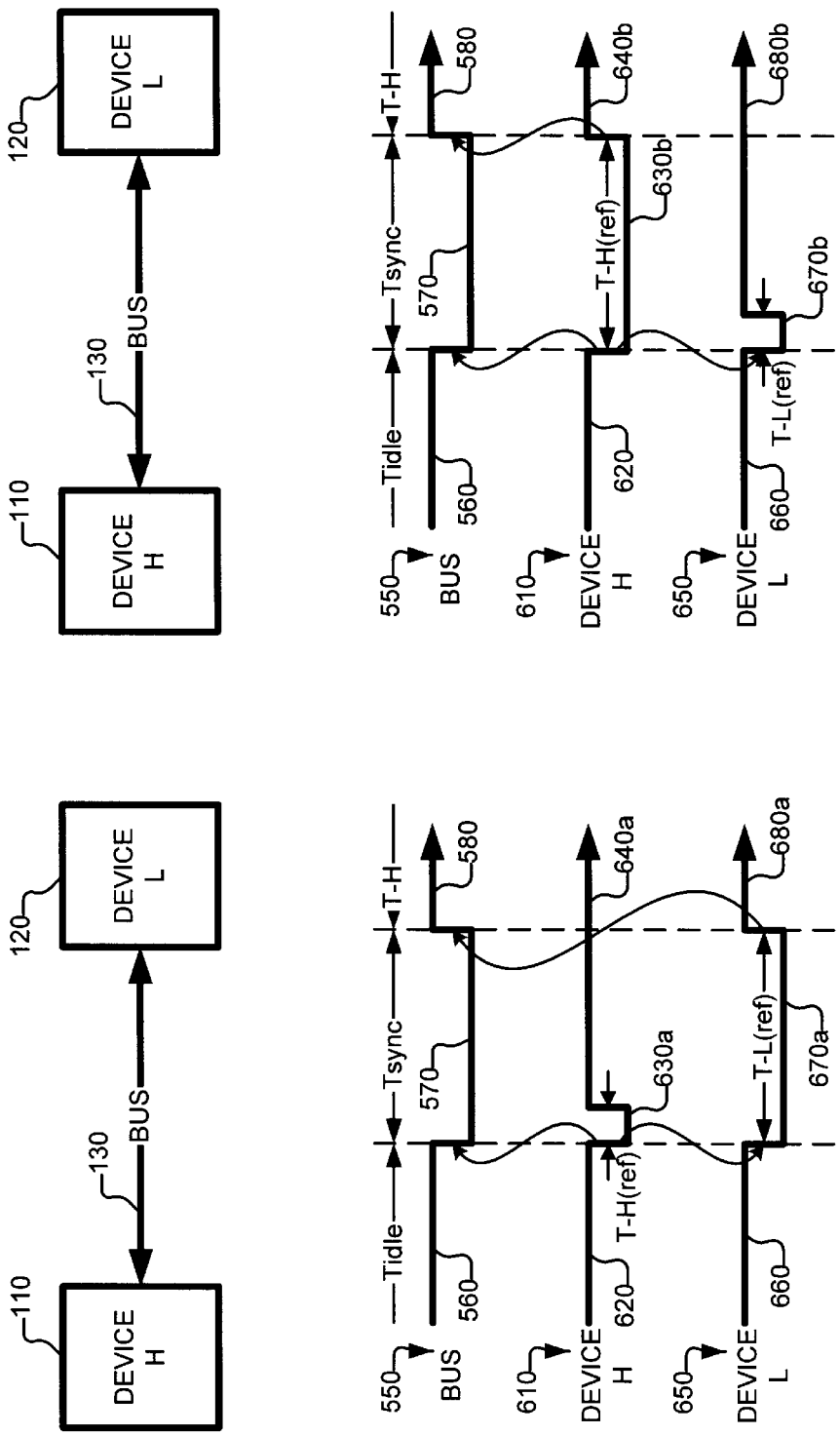

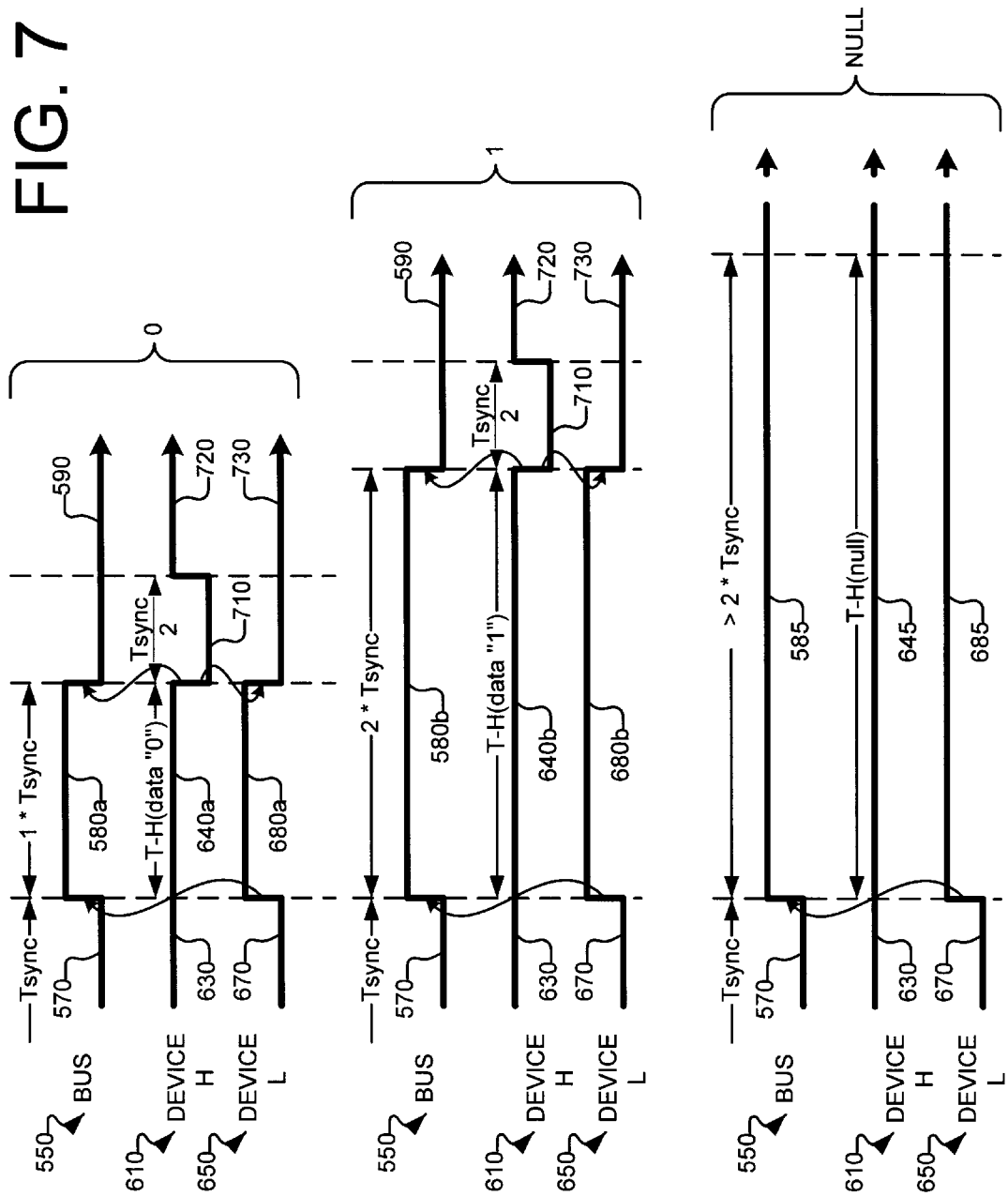

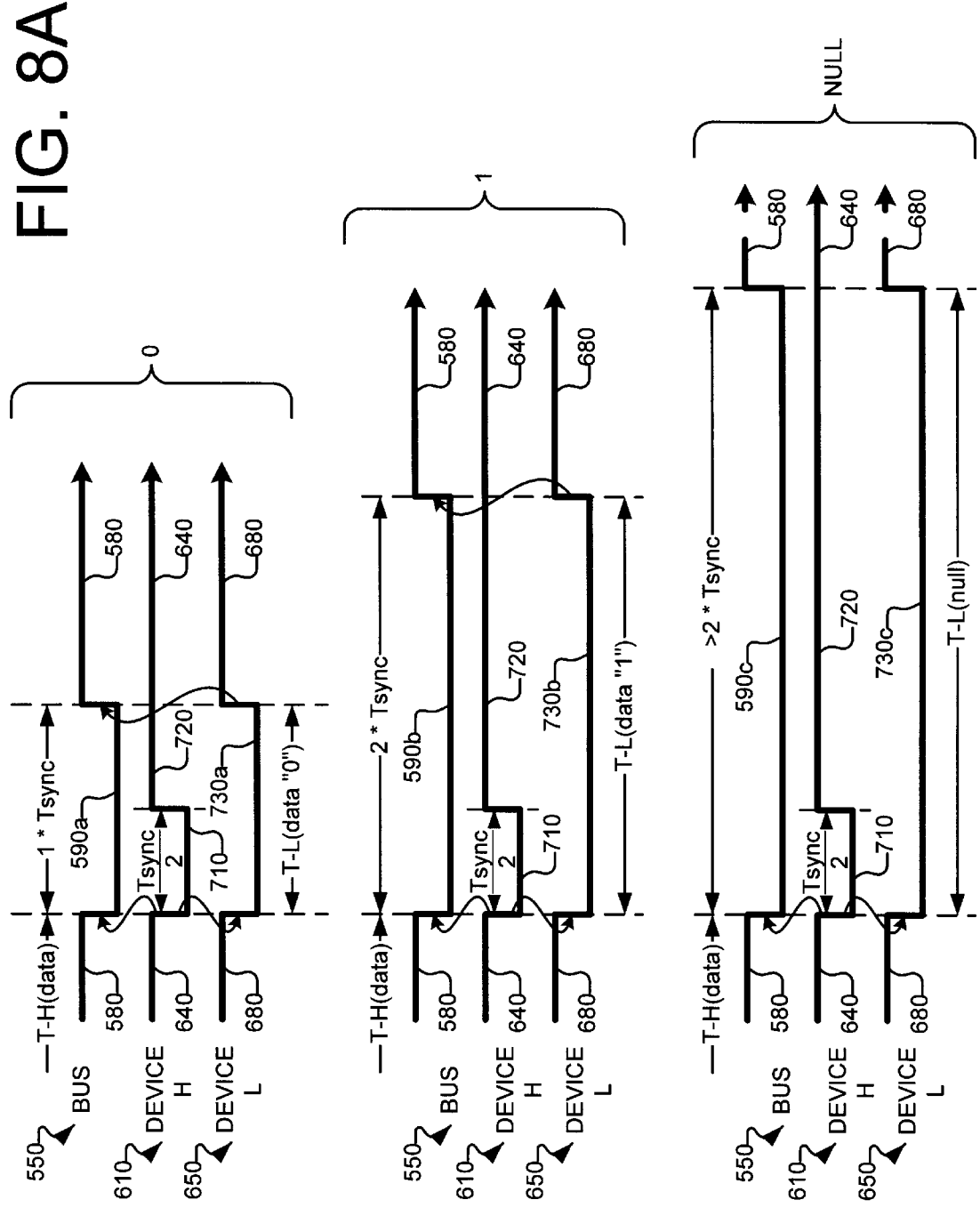

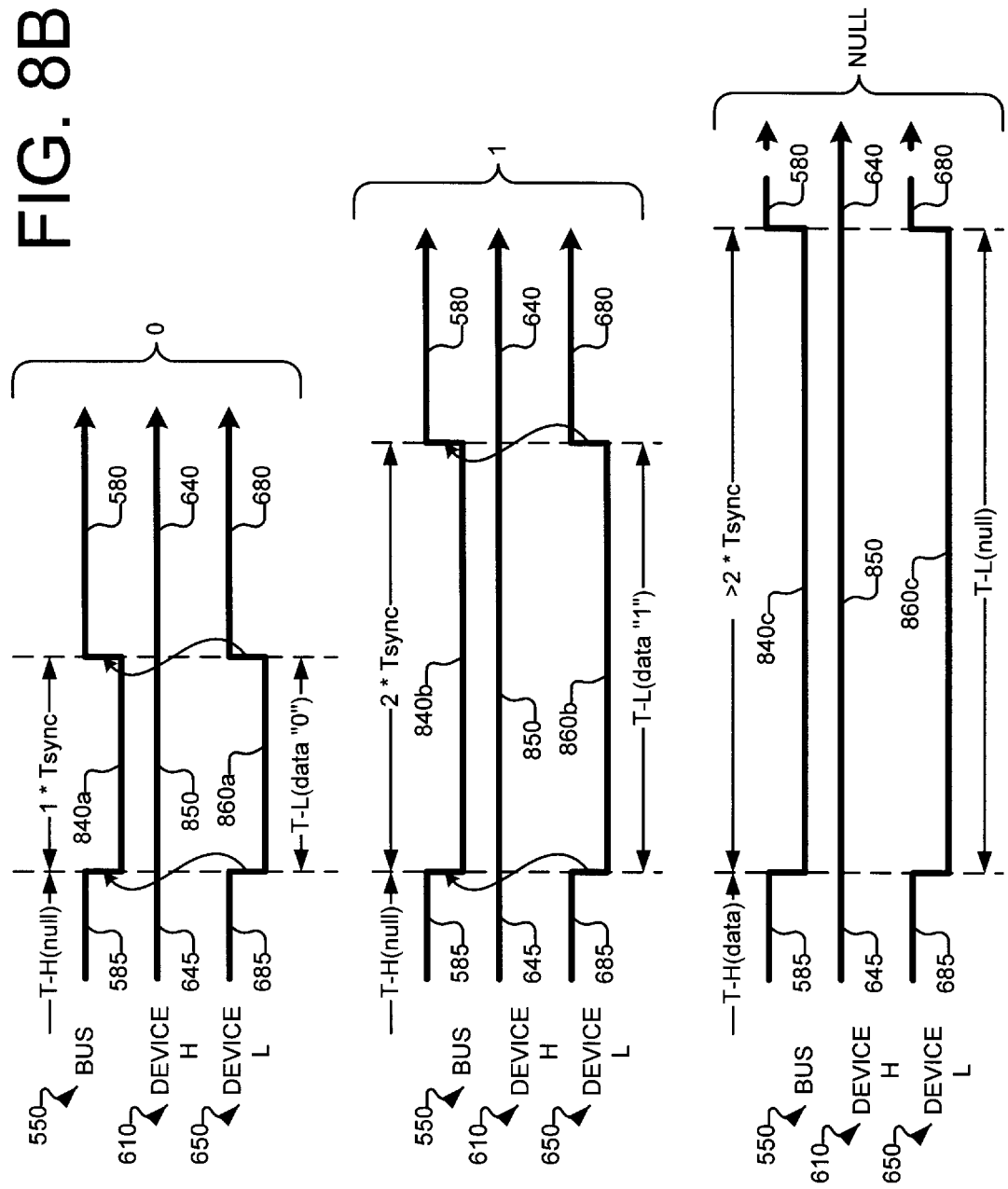

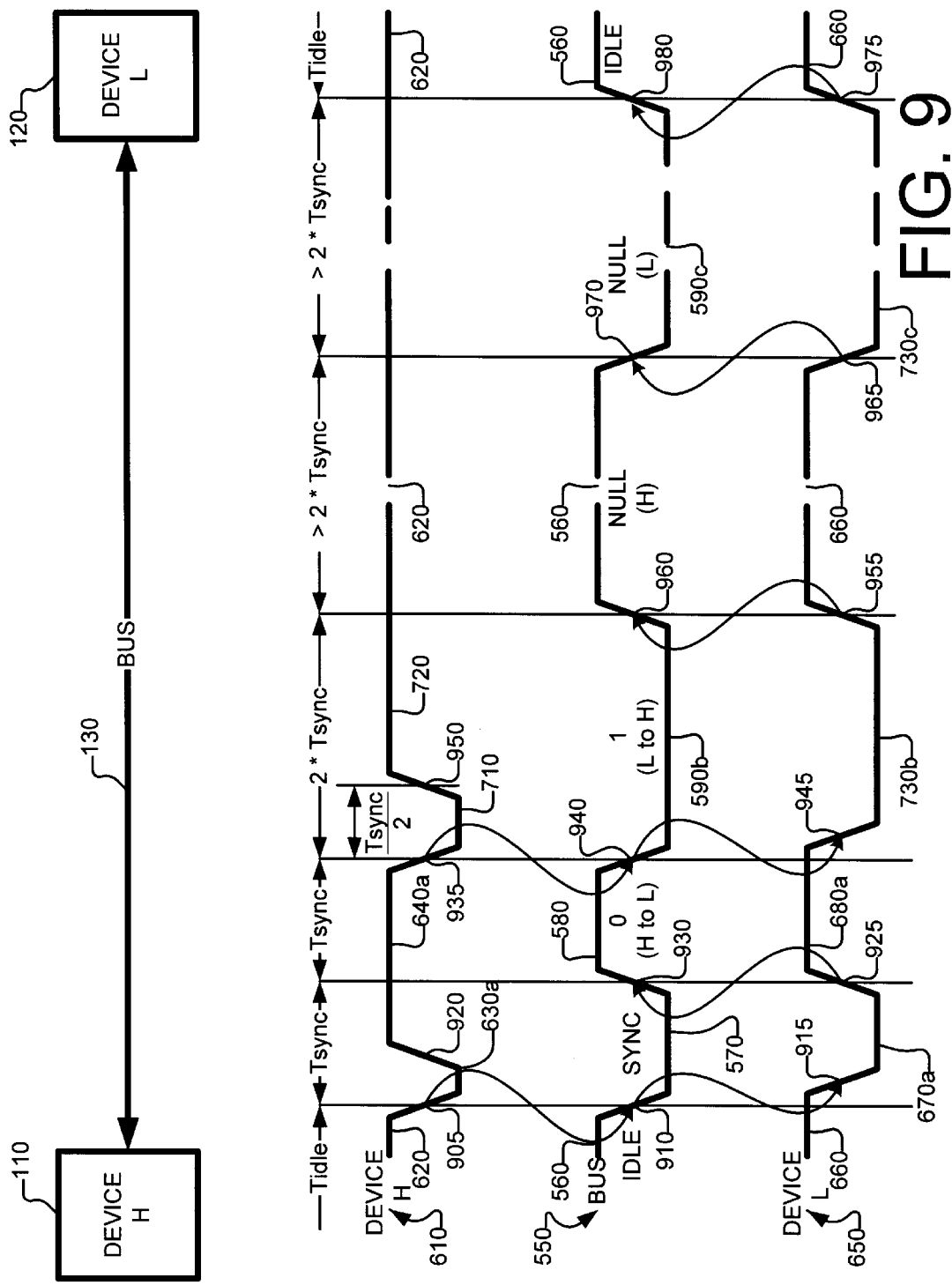

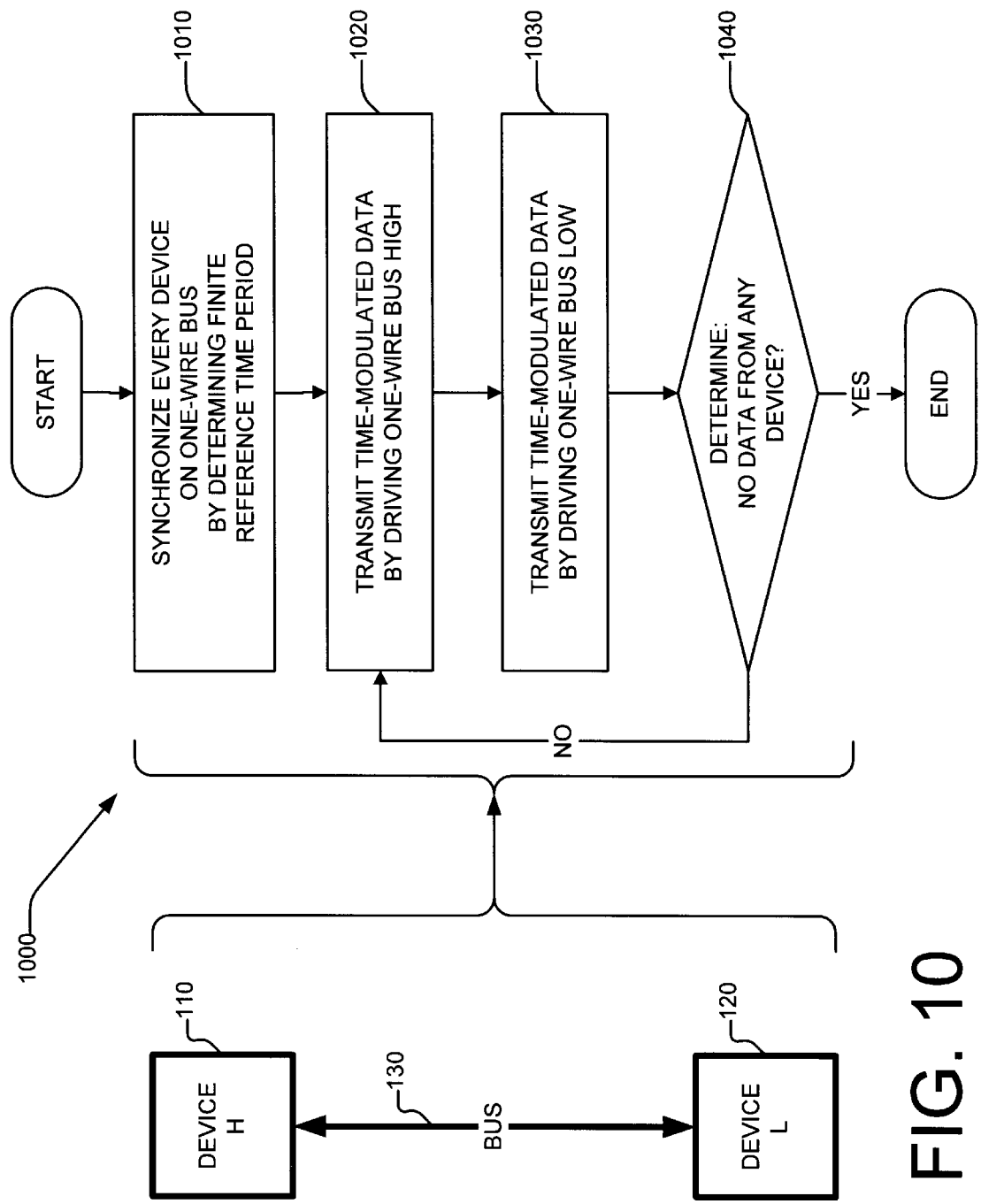

SYSTEM AND METHOD FOR COMMUNICATING OVER A ONE-WIRE BUS

CROSS REFERENCE TO RELATED APPLICATIONS

This application claims the benefit of U.S. Provisional Patent Application No. 60/291,272, dated May 16, 2001, which is incorporated herein by reference in its entirety.

FIELD OF INVENTION

The present invention is relates generally to wired communications and, more particularly, to a one-wire protocol for communicating between devices.

BACKGROUND

A one-wire system provides for communication of information over a single wire (or one-wire bus), which may eliminate costs associated with extra wires or extra pins on a package. However, due to the limited hardware (i.e., a one-wire bus), such a system typically requires that one device on the one-wire bus have some knowledge about the other devices on the one-wire bus, or that certain assumptions be made about the other devices on the one-wire bus. For example, in iButton (a product marketed by Dallas Semiconductor Corporation) one-wire systems, each device uses a global addressing scheme where it is assumed that each device has a priori knowledge of the address of other devices. Thus, in iButton systems, each device is required to include a target address (i.e., the address of the target device) in a data stream to ensure that the message reaches the correct target device. In addition to global addressing, iButton one-wire systems also use predefined data rates that are known a priori by all devices having access to the one-wire bus. Hence, all devices on the one-wire bus transmit data at predefined data rates even though the devices may have a much faster internal clock rate. This results in inefficient and underutilized bandwidth in data communication between iButton devices.

Given this deficiency, there is a need in the art for a more efficient one-wire protocol.

SUMMARY

The present invention relates to a system and method for transmitting and receiving data over a one-wire bus.

In architecture, one embodiment of the system includes at least two devices that communicate through a one-wire bus. The one-wire bus is configured to be driven high when every device on the one-wire bus is high, and the one-wire bus is configured to be driven low when any device on the one-wire bus is low. One of the at least two devices is configured to control the high behavior of the one-wire bus, while the other of the at least two devices is configured to control the low behavior of the one-wire bus. The devices are configured to encode data using time modulation. In another embodiment, the one-wire bus is configured to be driven high when any device on the one-wire bus is high, and the one-wire bus is configured to be driven low when every device on the one-wire bus is low.

Another embodiment of the invention can be viewed as providing a method for transmitting and receiving data over a one-wire bus. In this regard, one embodiment may be broadly summarized as driving a one-wire bus high when every device on the one-wire bus is high, driving the one-wire bus low when any device on the one-wire bus is low, and transmitting time-modulated data over the one-wire bus by controlling the high and low behavior of the one-wire bus.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a diagram showing one embodiment of the invention having a first device and a second device in communication with each other through a one-wire bus.

FIG. 2 is a diagram showing another embodiment of the invention having more than two devices in a daisy-chain configuration.

FIG. 5 is a timing diagram showing a synchronization period established from the clock periods of the various devices.

FIG. 6A is a diagram showing one example of a synchronization period between two devices having different clock periods.

FIG. 6B is a diagram showing another example of a synchronization period between two devices having different clock periods.

FIG. 7 is a timing diagram showing time modulation of data from the first device of FIG. 6A.

FIGS. 8A and 8B are timing diagrams showing time modulation of data from the second device of FIG. 6A.

FIG. 9 is a timing diagram showing an example of data communication between the first device and the second device of FIG. 6A.

FIG. 10 is a flowchart showing method steps in one embodiment of the invention.

DETAILED DESCRIPTION OF DRAWINGS

Figure 3:
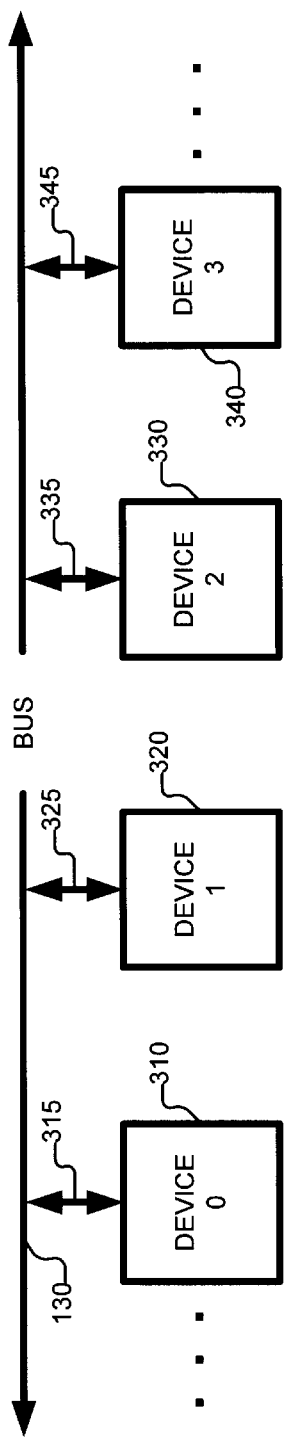
FIG. 3 is a diagram showing another embodiment of the invention having a plurality of devices in communication with each other through a one-wire bus.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

FIGS. 1 through 3 are diagrams showing several embodiments of the invention having devices in communication with each other through a one-wire bus. The system of FIG. 1 shows a simple embodiment in which a one-wire protocol may be implemented. In the simple embodiment, only a first device 110 and a second device 120 are present on the one-wire bus 130. Thus, the embodiment of FIG. 1 may be seen as a point-to-point configuration where the first device 110 is located on one end of the one-wire bus 130, while the second device is located on the other end of the one-wire bus 130. In a preferred embodiment, the first device 110 is configured to transmit data on the one-wire bus 130 by driving the one-wire bus 130 high, while the second device 120 is configured to transmit data on the one-wire bus 130 by driving the one-wire bus 130 low. Thus, the first device 110 is designated as device H 110, while the second device 120 is designated as device L 120. The significance of these designations will become clearer with reference to FIGS. 6A through 9. Also, since specific mechanisms for driving the one-wire bus 130 high or low are well known in the art, these mechanisms will not be discussed further. It is, however, worthwhile to note here that the point-to-point configuration of FIG. 1 allows implementation of a one-wire protocol without the need for any type of a priori addressing since data transmission from device H 110 may only be directed at device L 120, and vice versa, leading to an implicit addressing.

A more complicated embodiment is shown in FIG. 2, wherein a plurality of devices 210, 220, 230, 240 are daisy-chained together. For simplicity of illustration, these devices are designated as device 0 210, device 1 220, device 2 230, and device 3 240. As shown in FIG. 2, the devices are daisy-chained together so that device 0 210 is connected to device 1 220 by a one-wire bus 130a; device 1 220 is connected to device 2 230 by another one-wire bus 130b; device 2 230 is connected to device 3 240 by another one-wire bus 130c, etc. In such a daisy-chain configuration, each device 210, 220, 230, 240 comprises a high port 213, 223, 233, 243 that drives the one-wire bus 130a, 130b, 130c high, and a low port 216, 226, 236, 246 that drives the one-wire bus 130a, 130b, 130c low. Thus, the daisy-chain configuration may also be seen as a point-to-point configuration having multiple end points. Again, similar to the embodiment of FIG. 1, the point-to-point configuration of FIG. 2 allows implementation of a one-wire protocol without the need for any type of a priori addressing. For example, a high output from device 1 220 may only be directed at device 0 210 while a low output from device 1 220 may only be directed at device 2 230. This type of high-low modulation by each device 210, 220, 230, 240 allows for communication between all devices 210, 220, 230, 240 without the need for a priori addressing, since an implicit geographical addressing may be derived from the chain topology. Again, since mechanisms for driving the one-wire bus 130 high or low are well known in the art, these mechanisms will not be discussed further.

A third embodiment is shown in FIG. 3, wherein a plurality of devices 310, 320, 330, 340 are connected to a one-wire bus 130 at a single port 315, 325, 335, 345. This embodiment may not be considered as a point-to-point configuration since all of the devices 310, 320, 330, 340 have access to a common one-wire bus 130. Thus, this embodiment, designated as a peer-to-peer configuration, requires some sort of addressing so that each device has a priori knowledge of its (unique) address; the addresses of the other devices can later be discovered. In this sense, part of the inefficiency associated with the iButton one-wire protocol is manifest in the peer-to-peer configuration. However, as shown with reference to FIGS. 4 through 9 below, the inefficiency associated with a fixed data rate may be overcome even in a peer-to-peer configuration. In one embodiment of the peer-to-peer configuration, each device may transmit data by either modulating the high behavior of the bus 130, or by modulating the low behavior of the bus 130. In this embodiment, the system would be configured as a multi-master-multi-slave system, wherein the first device to transmit data (i.e., the device that initiates data transmission) would modulate the high behavior of the bus 130, and the next device to transmit data (i.e., the device that responds to the initiated data transmission) would modulate the low behavior of the bus 130. Thus, in the peer-to-peer configuration, since any of the devices connected to the bus 130 may initiate data transfer, an arbitration procedure would be employed to allow only one device to have control of the bus. In one embodiment, priority would be given to the device that transmits the first data bit. This is described in greater detail below.

Having described several embodiments in which a one-wire protocol may be implemented, attention is turned to FIGS. 4 through 9, which describe the method steps associated with the one-wire protocol.

Figure 4:
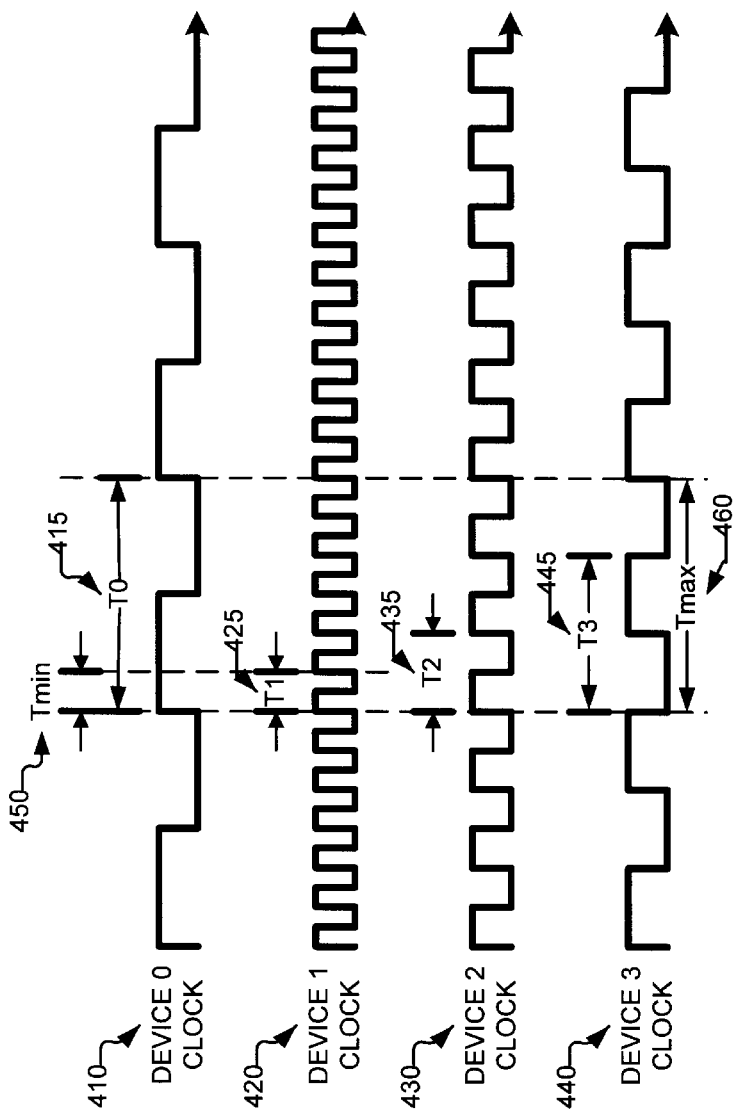
FIG. 4 is a timing diagram showing various clock periods associated with the devices of FIG. 2 or FIG. 3.

FIG. 4 is a timing diagram showing various clock periods associated with the devices of FIG. 2 or FIG. 3. For simplicity of illustration, rise and fall times associated with each clock period are ignored in FIGS. 4 through 8B. Thus, the rising edge and falling edge are shown as sharp edges. Additionally, for simplicity of illustration, delay times are presumed negligible in FIGS. 4 through 8B. Thus, the timing diagrams of FIGS. 4 through 8B are shown without any time delays.

In a system having multiple devices, each device may have its own internal clock period. For simplicity, this is illustrated in FIG. 4 using timing diagrams for four different clocks (i.e., device 0 clock 410, device 1 clock 420, device 3 clock 430, and device 4 clock 440). As shown in FIG. 4, device 0 clock 410 has an internal clock period defined by T0 415; device 1 clock 420 has an internal clock period defined by T1 425; device 2 clock 430 has an internal clock period defined by T2 430; and device 3 clock 440 has an internal clock period defined by T3 445. In the non-limiting example of FIG. 4, the device 1 clock 420 is shown as having the shortest internal clock period Tmin 450 while the device 0 clock 410 is shown as having the longest internal clock period Tmax 460. Given that the device clocks 410, 420, 430, 440 have different internal clock periods 415, 425, 435, 445, the system data rate must accommodate at least the slowest internal clock (i.e., the longest internal clock period Tmax 460) in order to properly transmit data between all of the devices. Thus, the system must either presume an a priori data rate, or have some way of determining a sufficient data rate to accommodate all devices on the one-wire bus assuming only a (potentially very wide) a priori range of rates. As described with reference to the iButton one-wire protocol, an a priori presumption of the data rate results in an inefficiency because the presumed data rate may be much longer than the longest internal clock period Tmax 460. Thus, the one-wire protocol of the present invention determines the data rate as a function of the slowest internal clock period Tmax 460, thereby minimizing wasted time that may be associated when the data rate is presumed. The procedure of determining the data rate is shown in FIG. 5 as a synchronization procedure.

FIG. 5 is a timing diagram showing the synchronization procedure established from the various device clocks 410, 420, 430, 440. A one-wire bus timing 550 is shown with reference to the various device clocks 410, 420, 430, 440 as well as various outputs 505, 515, 525, 535 from the devices. For purposes of illustration, the one-wire bus is shown as having a wired-AND configuration, wherein the one-wire bus is driven high when every device is high, and the one-wire bus is driven low when any device is low. However, it will be clear to one of ordinary skill in the art that the one-wire bus may, alternatively, be shown as having a wired-OR configuration, wherein the one-wire bus is driven high when any device is high, and the one-wire bus is driven low when every device is low. As shown in FIG. 5, device 0 clock 410 determines the behavior of output 0 505; device 1 clock 420 determines the behavior of output 1 515; device 2 clock 430 determines the behavior of output 2 525; and device 3 clock 440 determines the behavior of output 3 535. At the beginning of the synchronization procedure, all outputs 505, 515, 525, 535 of all devices are almost simultaneously driven low after an idle period Tidle 560, thereby initiating a synchronization period Tsync 570. All devices run a protocol that insures that all devices recognize the idle period, then an arbitrary device triggers the synchronization procedure by driving the bus low. All other devices detect the bus going low, which triggers their own synchronization procedure leading to all of them driving the bus low essentially simultaneously. The protocol to detect an idle period takes into account the a priori range of clock rates in the following fashion, each device will stay silent for k*N periods of its local clock, but accept any idle period longer than N periods of its own clock, with k being the ratio between the maximum and minimum rates in the a priori range of supported rates. This is shown in greater detail with reference to FIGS. 6A and 6B. Since all outputs 505, 515, 525, 535 are low, the one-wire bus is driven low at this point as a result of the wired-AND configuration. Upon outputting a low, each device counts a predetermined number of clock periods (also referred to as Nref clock periods) of its own internal clock, and as soon each device has counted Nref cycles of its own internal clock period, each device drives its output high. This period of counting Nref is referred to herein as Tref, and may vary with each device. Thus, in the non-limiting example of FIG. 5 where Nref=2, output 0 505 goes high after two periods of the device 0 clock 410; output 1 515 goes high after two periods of the device 1 clock 420, etc. Since the one-wire bus is configured as a wired-AND, the one-wire bus will remain low until the output of the device having the longest internal clock period goes high. This period between the one-wire bus going low and the one-wire bus going high is referred to as the synchronization period Tsync 570. During Tsync 570, each of the devices is configured to count a number of internal clock periods (also referred to as Nbus clock periods) so that all of the devices will be synchronized to the slowest device on the one-wire bus. Thus, in the specific example of FIG. 5, where device 1 clock 420 has the shortest internal clock period and device 0 clock has the longest internal clock period, the order of events would be as follows. First, all of the devices would produce a low output. At this point, each device would begin counting its own internal clock period while monitoring the one-wire bus. After Nref internal clock periods, each device would produce a high output. Thus, for the specific example of FIG. 5, device 1 would be the first to produce a high output after two internal clock periods because device 1 clock has the shortest internal clock period. Since, at this point, the one-wire bus is still low due to the wired-AND configuration, device 1 would continue to count its own internal clock periods. Shortly thereafter, device 2 would produce a high output because device 2 has the next shortest internal clock period. However, since the one-wire bus is still low at this point due to the wired-AND configuration, both devices 1 and 2 would continue to count their internal clock periods. Device 3 would subsequently produce a high output, but, since the one-wire bus is still low due to the wired-AND configuration, devices 1, 2, and 3 would continue to count their internal clock periods. Finally, device 4 would produce a high output. At this point, since all devices are producing a high output, the one-wire bus would be driven high. Once the one-wire bus is driven high, all devices stop counting their own internal clock periods. Since each device has been counting its own Nbus during Tsync 570, each device has knowledge of Tmax and, consequently, the fastest data rate allowable for the one-wire bus. In the specific example of FIG. 5, device 0 would have Nbus=2, device 1 would have Nbus=12, device 2 would have Nbus=6, and device 3 would have Nbus=3. In other words, device 0 would have a data rate of two internal clock periods, device 1 would have a data rate of twelve internal clock periods, device 2 would have a data rate of six internal clock periods, and device 3 would have a data rate of three internal clock periods. As shown in FIG. 5, the synchronization procedure removes the need for a priori knowledge of data transmission rate.

FIGS. 6A and 6B demonstrate the robustness of this synchronization approach using a two-device system. As shown in FIGS. 6A and 6B, regardless of which of the two devices has the longer internal clock period, both devices will be synchronized to each other. In FIG. 6A, a first device (hereinafter device H) 110 is shown as having a shorter clock period than a second device (hereinafter device L) 120. Thus, in FIG. 6A, Tref 630a for device H 110 is shorter than Tref 670a for device L 120. On the other hand, in FIG. 6B, device H 110 is shown as having the longer clock period. Thus, in FIG. 6B, Tref 630b for device H 110 is longer than Tref 670b for device L 120. As shown in FIGS. 6A and 6B, Tsync 570 is unaffected by the relative difference between Tref 630 of device H 110 and Tref 670 of device L 120. Since the synchronization procedure follows Tidle, there must be some mechanism by which all devices will know when to begin counting Nbus. In other words, at least one of the devices on the one-wire bus must initiate the counting of Nbus for all devices on the one-wire bus. For the two-device example of FIGS. 6A and 6B, device H 110 goes low, thereby driving the one-wire bus 130 low. This further triggers device L 120 to go low, and both device H 110 and device L 120 begin counting their internal clock periods at substantially the same time to determine their respective Nbus.

To insure that all devices unequivocally detect Tidle, the protocol implies that each device accepts any idle period longer than N periods, but that all devices wait k*N periods before starting a synchronization procedure, wherein k is the ratio between the a priori Tmin and Tmax clock periods. Since it is desirable that the one wire protocol cover a large a priori range, it is preferable that k be relatively large. However, this reduces the performance as each idle period becomes long. Once a synchronization step has been performed, the actual Tmax is known to within a finite degree of accuracy. Thus, that the idle period need not cover an a priori range between Tmin and Tmax, but, rather, may be confined to the range between Tmin and Tsync, or equivalently the a priori value k may be replaced by a measured value k' whereby k' is less than k. Hence, if k is large, then k' may be much smaller than k, and the protocol may use "short" idle periods defined by k'*N cycles of the quickest clock present instead of k*N cycles, thereby improving performance. One potential problem arises, however, when there is a dynamic attachment or removal of new devices to the bus 130 (FIG. 6A) in the peer-to-peer configuration because this effectively results in a dynamic modification of k'. Unfortunately, if a new device period Tnew is much larger than the currently measured Tsync, then the new device never recognizes the "short" idle period as an idle. This would happen, for example, if k'*N periods of the clocks already present is less than N*Tnew, and the newly added device never participates in a synchronization period and effectively cannot communicate with the already present devices. To avoid this situation from continuing indefinitely, one may, from time to time, insert a standard idle period (i.e., an idle period equal to k*N cycles). This would allow the newly attached device to detect the idle period and participate in the next synchronization period, which would, in turn, inform all other devices of the new k' reflecting the presence of the newly attached device.

FIG. 7 is a timing diagram showing time-modulation of data from the first device 110 (i.e., device H) to the second device 120 (i.e., device L) of FIG. 6A. As described with reference to FIG. 6A, at the end of Tsync 570, the one-wire bus 130 (FIG. 6A) is high, and both device H 110 (FIG. 6A) and device L 120 (FIG. 6A) are high. In a preferred embodiment, device H 110 (FIG. 6A) is configured to transmit data to device L 120 (FIG. 6A) by time-modulating the high behavior of the one-wire bus 130 (FIG. 6A). Thus, device H 110 (FIG. 6A) maintains the one-wire bus 130 (FIG. 6A) high for a finite time period 580a, 580b, 585 in order to transmit a false bit 580a (i.e., binary "0"), a true bit 580b (i.e., binary "1"), or to indicate absence of data 585 (i.e., no data or null). In the preferred embodiment, device H 110 (FIG. 6A) defines binary "0" 580a by maintaining a high output 640a for a duration of approximately 1*Tsync. Device H 110 (FIG. 6A) defines binary "1" 580b by maintaining a high output 640b for a duration of approximately 2*Tsync. And device H 110 (FIG. 6A) defines null 585 by maintaining a high output 645 for a duration that is significantly greater than approximately 2*Tsync (e.g., 3*Tsync, etc.).

Once device H 110 (FIG. 6A) has transmitted either binary "0" 580a or binary "1" 580b, device H 110 (FIG. 6A) goes low 710, thereby driving the one-wire bus low. This further triggers device L 120 (FIG. 6A) to go low 730. Thus, at this point, device H 110 (FIG. 6A) has completed data transmission, both devices are low, and device L 120 (FIG. 6A) gets ready for data transmission.

Alternatively, if null 585 is transmitted (i.e., the one-wire bus is high for a duration greater than approximately 2*Tsync), then both devices are high, and device L 120 (FIG. 6A) gets ready for data transmission. Thus, data transmission by device L 120 (FIG. 6A) is triggered when either the one-wire bus 130 (FIG. 6A) goes low 710, or the one-wire bus 130 (FIG. 6A) remains high for a duration significantly greater than approximately 2*Tsync.

As mentioned above with reference to FIG. 3, in a peer-to-peer configuration, all of the devices may potentially contend for the bus 130 (FIG. 6A) at the same time. Thus, it would be desirable to have an arbitration scheme so that the system may determine which of the devices in the peer-to-peer configuration are contending for control of the bus 130 (FIG. 6A). In one embodiment, this would be resolved immediately after the synchronization procedure. Since the bus 130 (FIG. 6A) is high after the synchronization procedure, if multiple devices wish to transmit data, the device that goes low first would have control of the bus 130 (FIG. 6A) because of the wired-AND configuration. At this point, all other devices that wish to transmit data would remain go low in response to the transmitting device. Once the transmitting device is done with data transmission, the other devices that went low would go high. At this point, if multiple devices are again contending for control of the bus, the last device to go high would gain control of the bus 130 (FIG. 6A) due to the wired-AND configuration. As one can see, the high behavior of the bus 130 (FIG. 6A) would typically be modulated by the device that is triggered first after synchronization, while the low behavior of the bus 130 (FIG. 6A) would typically be modulated by the device that is triggered last after the high modulation of the bus 130 (FIG. 6A). Apart from this, and the need for addressing in a peer-to-peer configuration, there is little difference in the protocol between the point-to-point configuration (FIGS. 1 and 2) and the peer-to-peer configuration (FIG. 3).

FIG. 8A is a timing diagram showing time modulation of data from the second device 120 (i.e., device L) of FIG. 6A when the one-wire bus 130 (FIG. 6A) goes low. As described with reference to FIG. 7, one result of completed data transmission by device H 110(FIG. 6A) is that the one-wire bus 130 (FIG. 6A), device H 110 (FIG. 6A), and device L (FIG. 6A) are all low. At this point, device L 120 (FIG. 6A) is configured to transmit data to device H 110 (FIG. 6A) by time-modulating the low behavior of the one-wire bus 130 (FIG. 6A). Thus, device L 120 (FIG. 6A) maintains the one-wire bus 130 (FIG. 6A) low for a finite time period 590a, 590b, 590c in order to transmit binary "0" 590a, binary "1" 590b, or null 590c. In the preferred embodiment, device L 120 (FIG. 6A) defines binary "0" 590a by maintaining a low output 730a for a duration of approximately 1*Tsync. Device L 120 (FIG. 6A) defines binary "1" 590b by maintaining a low output 730b for a duration of approximately 2*Tsync. And device L 120 (FIG. 6A) defines null 590c by maintaining a low output 730c for a predefined duration that is significantly greater than approximately 2*Tsync, and, thereafter, releasing the bus 130 (FIG. 6A) to go high 680. While device L 120 (FIG. 6A) is time modulating the low behavior of the one-wire bus 130 (FIG. 6A), device H 110 (FIG. 6A) is preparing for its next data transmission. Since the one-wire bus 130 (FIG. 6A) has a wired-AND configuration, both device H 110 (FIG. 6A) and device L 120 (FIG. 6A) must be high in order to drive the one-wire bus 130 (FIG. 6A) high. Thus, in order to time modulate the high behavior of the one-wire bus 130 (FIG. 6A) once device L 120 (FIG. 6A) has completed data transmission, device H 110 (FIG. 6A) must already be high. This may be accomplished by having device H 110 (FIG. 6A) go high after a duration of approximately Tsync/2, or any duration less than Tsync. In this way, when device L 120 (FIG. 6A) has finished data transmission, the one-wire bus 130 (FIG. 6A) will be ready for data transmission by device H 110 (FIG. 6A). As shown in FIG. 8A, regardless of the bit-value transmitted by device L 120 (FIG. 6A), the bus will go high after either approximately 1*Tsync, approximately 2*Tsync, or an interval that is significantly greater than 2*Tsync.

FIG. 8B is a timing diagram showing time modulation of data from the second device 120 (i.e., device L) of FIG. 6A when the first device 110 (i.e., device H) indicates null 585. Unlike FIG. 8A, data transmission by device L 120 (FIG. 6A) in FIG. 8B begins with the one-wire bus 130 (FIG. 6A) high, device H 110 (FIG. 6A) high, and device L 120 (FIG. 6A) high. When device L 120 (FIG. 6A) has determined that device H 110 (FIG. 6A) has nothing to transmit (i.e., the one-wire bus is high for a duration that is significantly greater than 2*Tsync), then device L 120 (FIG. 6A) may transmit data by driving the one-wire bus 130 (FIG. 6A) low. Since the system has a wired-AND configuration, this may be done while device H 110 (FIG. 6A) is still high. Similar to FIG. 8A, device L 120 (FIG. 6A) defines binary "0" 840a by maintaining a low output 860a for a duration of approximately 1*Tsync. Also, device L 120 (FIG. 6A) defines binary "1" 840b by maintaining a low output 860b for a duration of approximately 2*Tsync. And device L 120 (FIG. 6A) defines null 840c by maintaining a low output 860c for a duration that is significantly greater than approximately 2*Tsync, and, thereafter, releasing the bus 130 (FIG. 6A) to go high 680. Since, in FIG. 8B, device H 110 (FIG. 6A) remains high during data transmission by device L 120 (FIG. 6A), device H 110 (FIG. 6A) is ready to transmit data as soon as device L 120 (FIG. 6A) has finished transmitting binary "0" 840a, binary "1" 840b, or null 840c. Thus, at this point, the one-wire bus would be in a state similar to the end of the synchronization procedure as shown in FIG. 6A or FIG. 6B. Device H 110 (FIG. 6A) would, therefore, be able to follow the timing as shown in FIG. 7 to transmit additional data.

In a preferred embodiment, the procedure as shown in FIGS. 6A through 8B would be recursively executed so that device H 110 (FIG. 6A) and device L 120 (FIG. 6B) would exchange data on a bit-by-bit basis. In other words, since device H 110 (FIG. 6A) time modulates the high behavior of the one-wire bus 130 (FIG. 6A) and device L 120 (FIG. 6B) time modulates the low behavior of the one-wire bus 130 (FIG. 6A), the two devices would alternate data transmission on a bit-by-bit basis.

FIG. 9 is an example timing diagram showing, in order, a synchronization procedure, binary "0" transmission from device H 110 to device L 120, and binary "1" transmission from device L 120 to device H 110. The example of FIG. 9 shows device H 110 as having a shorter internal clock period than device L. Furthermore, unlike FIGS. 4 through 8B, the example here illustrates a timing diagram showing rising edges, falling edges, and timing delays.

As shown in FIG. 9, when device H 110 desires to transmit data after an idle period, it initiates a synchronization procedure. This is done when device H 110 generates a falling edge 905. The falling edge 905 drives the one-wire bus 130 low 910 because the one-wire bus 130 is configured as a wired-AND. The falling edge 910 of the one-wire bus 130 then triggers device L 120 to go low 915. After the device H 110 goes low, it counts Nref cycles of its own internal clock period, and then generates a rising edge 920. After device L 120 goes low, it also counts Nref cycles of its own internal clock period, and then generates a rising edge 925. This rising edge 925 of device L 120 causes the one-wire bus 130 to go high 930 since device H 110 has already gone high. At this point, both device H 110 and device L 120 are synchronized in that each device has an internal Nbus that is indicative of Tsync 570. Since, here, device H 110 desires to transmit binary "0" 580, device H 110 maintains a high 640a for a duration of approximately 1*Tsync. Upon transmitting binary "0" 580, device H 110 generates a falling edge 935, thereby driving the one-wire bus 130 low 940. This, in turn, triggers device L 120 to go low 945. After the one-wire bus 130 has gone low for a duration of approximately Tsync/2, device H 110 generates a rising edge 950 in order to prepare the system for either another data transmission or another synchronization procedure. Since the one-wire bus has a wired-AND configuration, device L controls the one-wire bus at this point. During this time, device L 120 maintains a low 730b for a duration of approximately 2*Tsync, thereby transmitting binary "1" 590b to device H 110. Upon transmission of binary "1" 590b, device L 120 releases the one-wire bus by generating a rising edge 955. Since device H 110 has already gone high 720, the rising edge 955 of device L drives the one-wire bus 130 high 960. Thus, at this point, device H 110 and device L 120 drive the one-wire bus 130 high. At this point, since device H 110 has no further data to transmit, it does not drive the bus 130 low. Hence, after waiting for a period significantly greater than 2*Tsync, device L 120 drives the bus 130 low. However, since device L 120 has no data to transmit, it maintains the bus 130 low for a period significantly greater than 2*Tsync, and, thereafter, releases the bus to go high. Thus, at this point, device H 110 has been high for a duration that is significantly greater than 2*Tsync, device L 120 has released the bus after having been low for a duration that is significantly greater than 2*Tsync, and the bus 130 is high, awaiting a synchronization procedure. This condition allows device H 110 to initiate another synchronization procedure in the future when device H 110 has data to transmit.

As shown in FIGS. 1 through 9, the one-wire protocol here allows data transmission on the one-wire bus 130 using a minimum number of assumptions. This, in turn results in a faster transmission of data between devices on the one-wire bus 130.

Figure 11:
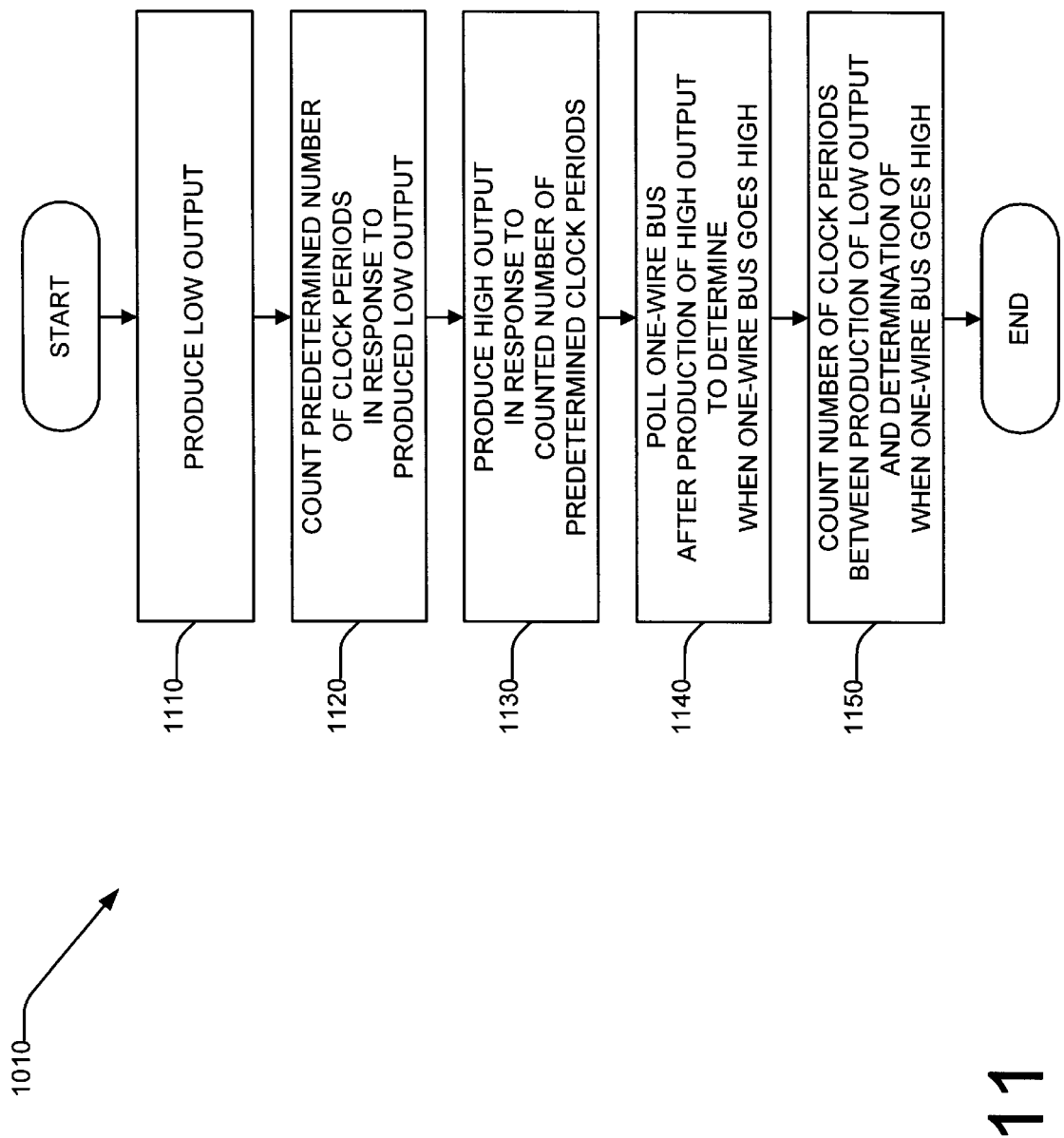
FIG. 11 is a flowchart showing the synchronization step of FIG. 10 in greater detail.

FIG. 10 is a flowchart 1000 showing method steps in one embodiment of the invention. As shown in FIG. 10, each device 110, 120 on the one-wire bus 130 is synchronized, in step 1010, by determining a finite reference time period. Details related to the synchronization of each device are described above, with reference to FIGS. 5, 6A, and 6B. Once the devices 110,120 are synchronized 1010, device H 110 transmits, in step 1020, time-modulated data by driving the one-wire bus 130 high. Details related to the operation of device H 110 are described above with reference to FIGS. 7 and 9. Following data transmission 1020 by device H 110, device L 120 transmits, in step 1030, time-modulated data by driving the one-wire bus 130 low. Details related to the operation of device L 120 are described above with reference to FIGS. 8A, 8B, and 9. If it is determined, in step 1040, that there is no further data to be transmitted by either of the devices, the method steps end, and the system enters an idle period, thereby awaiting the next synchronization step 1010. Otherwise, data transmission is interleaved in such a fashion that device H 110 transmits 1020 after data transmission 1030 by device L 120, and device L 120 transmits 130 after data transmission 1020 by device H 110, etc. FIG. 11 is a flowchart showing the synchronization step 1010 in greater detail. As shown in FIG. 11, both devices 110, 120 (FIG. 10) produce, in step 1110, a low output. These devices 110, 120 (FIG. 10) then count, in step 1120, a predetermined number of internal clock periods in response to the produced 1110 low output. Details related to this are also described above with reference to FIGS. 5, 6A, and 6B. Once the device has counted 1120 the predetermined number of clock periods, the device produces, in step 1130 a high output. After producing 1130 the high output, the device polls, in step 1140, the one-wire bus 130 (FIG. 10) to determine when the one-wire bus 130 (FIG. 10) goes high. After the device goes high, the device continues to count, in step 1150, a number of clock periods until the one-wire bus 130 (FIG. 10) goes high. This period, between the device going low and the one-wire bus going high, is the synchronization period, which is described in detail with reference to FIGS. 5, 6A, and 6B.

As shown in FIGS. 10 and 11, one embodiment of the method permits the transmission of data on a one-wire bus with a minimal number of a priori presumptions.

Although an exemplary embodiment of the present invention has been shown and described, it will be apparent to those of ordinary skill in the art that a number of changes, modifications, or alterations to the invention as described may be made, none of which depart from the spirit of the present invention. For example, while the preferred embodiment shows the one-wire bus as having a wired-AND configuration, it will be clear to one of ordinary skill in the art that a wired-OR configuration may be used. Additionally, while the preferred embodiment describes a system having only two devices on the one-wire bus, it will be clear to one of ordinary skill in the art that more than two devices may be in communication with each other. In this sense, the devices may be daisy-chained together as shown in FIG. 2 so that the communication between devices is seen as an end-to-end configuration, or, alternatively, the devices may all have access to the one-wire bus as shown in FIG. 3 so that any of the devices may access the one-wire bus directly in a peer-to-peer configuration. Thus, in the daisy-chain configuration, each pair of devices would follow the behavior of device H and device L as shown in FIGS. 6A and 6B. Thus, the data rate of each one-wire bus 130a, 130b, 130c may be optimized to its respective device pair since each device pair would establish its own data rate. Additionally, while the preferred embodiment shows one device as modulating the high behavior of the one-wire bus and another device as modulating the low behavior of the one-wire bus, the devices may be configured to modulate both the high and the low behavior of the one-wire bus. Furthermore, while the preferred embodiment describes binary "1" bit being longer than binary "0" bit, it will be clear to one of ordinary skill in the art that binary "0" bit may be defined as being longer than binary "1" bit. Moreover, while FIG. 2 shows only a daisy-chain configuration and FIG. 3 shows only a peer-to-peer configuration, it will be clear to one of ordinary skill in the art that a hybrid configuration may be implemented, wherein certain devices are connected to the one-wire bus in a peer-to-peer configuration while other devices are connected in a daisy-chain (or point-to-point) configuration. Furthermore, while the preferred embodiment shows initiation of data transmission by device H (i.e., modulation of one-wire bus-high), it will be clear to one of ordinary skill in the art that data transmission may be initiated by device L (i.e., modulation of one-wire bus-low). Also, while not discussed in detail, it will be clear to one of ordinary skill in the art that the rising and falling edges of FIG. 9 could be made active (except the first rising edge terminating the synchronization period), thereby making the edges sharper. All such changes, modifications, and alterations should therefore be seen as within the scope of the present invention.

I claim:

1. A system for transmitting and receiving data over a one-wire bus, comprising:
    a one-wire bus having a plurality of devices connected to the one-wire bus, wherein the one-wire bus is configured to be driven high when every device on the one-wire bus is high, wherein the one-wire bus is configured to be driven low when any device on the one-wire bus is low, wherein each of the plurality of devices is configured to count a finite time period, wherein the finite time period is a function of one of the plurality of devices having a slowest clock speed;
    a first device configured to encode data using time modulation, wherein a false bit is encoded as a duration of approximately the finite time period, wherein a true bit is encoded as a duration of approximately double the finite time period, wherein absence of data is encoded as a duration of greater than approximately double the finite time period, wherein the first device is further configured to transmit the encoded data by driving the one-wire bus high, wherein the first device is further configured to drive the one-wire bus low for a duration of approximately half of the finite time period upon complete transmission of the encoded data, wherein the first device is further configured to drive the one-wire bus high after driving the one-wire bus low for the duration of approximately half of the finite time period;
    a second device configured to encode data using time modulation, wherein a false bit is encoded as a duration of approximately the finite time period, wherein a true bit is encoded as a duration of approximately double the finite time period, wherein absence of data is encoded as a duration of greater than approximately double the finite time period, wherein the second device is further configured to transmit the encoded data by driving the one-wire bus low.

2. A system for transmitting and receiving data over a one-wire bus, comprising:
    a one-wire bus having a plurality of devices connected to the one-wire bus, wherein the one-wire bus is configured to be driven high when every device on the one-wire bus is high, wherein the one-wire bus is configured to be driven low when any device on the one-wire bus is low;
    a first device configured to encode data using time modulation, wherein the first device is further configured to transmit the encoded data by driving the one-wire bus high; and
    a second device configured to encode data using time modulation, wherein the second device is further configured to transmit the encoded data by driving the one-wire bus low.

3. The system of claim 2, wherein the first device and the second device are configured to interleave data transmission.

4. The system of claim 2, wherein the plurality of devices each have an internal clock period, wherein each of the plurality of devices is configured to count a finite time period using its internal clock period.

5. The system of claim 4, wherein the finite time period is an integer multiple of one of the plurality of devices having a longest internal clock period.

6. The system of claim 4, wherein the first device and the second device are configured to encode a false bit as a duration of approximately the finite time period, wherein the first device and the second device are configured to encode a true bit as a duration of approximately double the finite time period, wherein the first device and the second device are configured to encode absence of data as a duration of greater than approximately double the finite time period.

7. The system of claim 4, wherein the first device and the second device are configured to encode a true bit as a duration of approximately the finite time period, wherein the first device and the second device are configured to encode a false bit as a duration of approximately double the finite time period, wherein the first device and the second device are configured to encode absence of data as a duration of greater than approximately double the finite time period.

8. The system of claim 6, wherein the first device is further configured to drive the one-wire bus low for a duration of approximately half of the finite time period after transmitting data.

9. The system of claim 4, wherein the first device is further configured to transmit data after all of the plurality of devices has counted the finite time period, wherein the data transmitted by the first device is selected from a group consisting of:

a false bit;

a true bit; and absence of data.

10. The system of claim 9, wherein the second device is further configured to receive the data transmitted by the first device, wherein the second device is further configured to transmit data in response to the data received from the first device, wherein the data transmitted by the second device is selected from a group consisting of:

a false bit;

a true bit; and absence of data.

11. The system of claim 10, wherein the first device is further configured to receive the data transmitted by the second device, wherein the first device is further configured to transmit data in response to the data received from the second device.

12. A system for transmitting and receiving data over a one-wire bus, comprising:

a one-wire bus having a plurality of devices connected to the one-wire bus, wherein the one-wire bus is configured to be driven low when every device on the one-wire bus is low, wherein the one-wire bus is configured to be driven high when any device on the one-wire bus is high;

a first device configured to encode data using time modulation, wherein the first device is further configured to transmit the encoded data by driving the one-wire bus high; and a second device configured to encode data using time modulation, wherein the second device is further configured to transmit the encoded data by driving the one-wire bus low.

13. A method for transmitting and receiving data over a one-wire bus, comprising the steps of:

transmitting time-modulated data by driving the one-wire bus high, wherein the one-wire bus is driven high when every device on the one-wire bus is high; and transmitting time-modulated data by driving the one-wire bus low, wherein the one-wire bus is driven low when any device on the one-wire bus is low.

14. The method of claim 13, further comprising the step of interleaving the step of transmitting time-modulated data by driving the one-wire bus high and the step of transmitting data by driving the one-wire bus low.

15. The method of claim 13, further comprising the step of synchronizing every device on the one-wire bus.

16. The method of claim 15, wherein the step of synchronizing every device on the one-wire bus comprises the step of determining a finite time period.

17. The method of claim 16, wherein the step of determining a finite time period comprises the steps of:

producing a low output;

counting a predetermined number of clock periods after producing the low output;

producing a high output in response to the counting of the predetermined number of clock periods;

polling a one-wire bus after producing the high output to determine when the one-wire bus goes high;

counting a number of clock periods between the production of the low output and the determination of when the one-wire bus goes high.

18. The method of claim 16, wherein the step of transmitting time-modulated data by driving the one-wire bus high is responsive to the step of synchronizing every device on the one-wire bus.

19. The method of claim 16, wherein the step of transmitting time-modulated data by driving the one-wire bus low is responsive to the step of transmitting time-modulated data by driving the one-wire bus high.

20. The method of claim 16, wherein the step of transmitting time-modulated data by driving the one-wire bus high is responsive to the step of transmitting time-modulated data by driving the one-wire bus low.

21. The method of claim 16, wherein the step of transmitting time-modulated data by driving the one-wire bus high further comprises the step of determining data content, wherein the data content is selected from a group consisting of:

a false bit;

a true bit; and absence of data.

22. The method of claim 21, further comprising the steps of:

defining the false bit as a duration of time equal to approximately the finite time period;

defining the true bit as a duration of time equal to approximately double the finite time period; and defining absence of data as a duration of time greater than approximately double the finite time period.

23. The method of claim 16, further comprising the step of driving the one-wire bus low in response to the step of transmitting time-modulated data by driving the one-wire bus high.

24. The method of claim 16, further comprising the step of receiving data in response to the step of transmitting time-modulated data by driving the one-wire bus high.

25. The method of claim 16, wherein the step of transmitting time-modulated data by driving the one-wire bus low further comprises the step of determining data content, wherein the data content is selected from a group consisting of:

a false bit;

a true bit; and absence of data.

26. The method of claim 25, further comprising the steps of:

defining the false bit as a duration of time equal to approximately the finite time period;

defining the true bit as a duration of time equal to approximately double the finite time period; and defining absence of data as a duration of time greater than approximately double the finite time period.

27. The method of claim 16, further comprising the step of driving the one-wire bus high in response to the step of transmitting time-modulated data by driving the one-wire bus low.

28. The method of claim 16, further comprising the step of receiving data in response to the step of transmitting time-modulated data by driving the one-wire bus low.

29. A system for transmitting and receiving data over a one-wire bus, comprising:

a one-wire bus having a plurality of devices connected to the one-wire bus, wherein the one-wire bus is configured to be driven high when every device on the one-wire bus is high, wherein the one-wire bus is configured to be driven low when any device on the one-wire bus is low;

means for encoding data using time modulation;

means for transmitting the encoded data by driving the one-wire bus high; and means for transmitting the encoded data by driving the one-wire bus low.

30. A system for transmitting and receiving data over a one-wire bus, comprising:

a one-wire bus having a plurality of devices connected to the one-wire bus, wherein the one-wire bus is configured to be driven low when every device on the one-wire bus is low, wherein the one-wire bus is configured to be driven high when any device on the one-wire bus is high;

means for encoding data using time modulation;

means for transmitting the encoded data by driving the one-wire bus high; and means for transmitting the encoded data by driving the one-wire bus low.

* * * * *